United States Patent [19]
Eda

[11] Patent Number: 4,901,536
[45] Date of Patent: Feb. 20, 1990

[54] AIR-CONDITIONER CONTROL SYSTEM

[75] Inventor: Masahiro Eda, Higashimatsuyama, Japan

[73] Assignee: Diesel Kiki Co., Ltd., Tokyo, Japan

[21] Appl. No.: 277,556

[22] Filed: Nov. 29, 1988

[30] Foreign Application Priority Data

Dec. 2, 1987 [JP] Japan ................... 62-303411

[51] Int. Cl.⁴ ........................................... F25B 49/00
[52] U.S. Cl. ....................................... 62/126; 62/127; 236/94
[58] Field of Search ................. 62/125, 126, 127, 129, 62/130, 163; 165/11.1; 236/94

[56] References Cited

U.S. PATENT DOCUMENTS 4,685,615  8/1987  Hart ........................................ 236/94
4,715,191 12/1987  Umemura et al. ..................... 62/126
4,819,714  4/1989  Otsuka et al. ......................... 236/94

FOREIGN PATENT DOCUMENTS 58-141912  8/1983  Japan .

OTHER PUBLICATIONS

Mazda Service Manual of Auto Air Conditioner, Cat. No. 525179, 4/1984.

Primary Examiner—Harry B. Tanner

[57] ABSTRACT

A control system for controlling an actuator and a display unit of an air-conditioner, and a method of adjusting the control system. An operational amplifier executes calculation on the basis of analogue data from a plurality of temperature-data input terminals. An output from the operational amplifier is sent to a microcomputer through an A/D converter. In a normal control mode, the microcomputer controls the display unit and the actuator of the air conditioner. The microcomputer executes also an adjusting mode in which the microcomputer controls the display unit to display an outut voltage from the operational amplifier. The microcomputer selects one of the modes to be executed in response to a mode signal from a mode-signal generator. A reference voltage is inputted to the operational amplifier from a reference-voltage generating circuit. The reference voltage is adjusted such that the output voltage from the operational amplifier displayed on the display unit is brought to a predetermined standard level.

9 Claims, 5 Drawing Sheets

AIR-CONDITIONER CONTROL SYSTEM

BACKGROUND OF THE INVENTION

The present invention relates to a control system for air conditioners installed on vehicles and the like.

Japanese patent application Laid-Open No. 58-141912 discloses an air-conditioner control system which is provided with a microcomputer. Analog temperature data from an indoor-air temperature setter, an indoor-air temperature sensor, an outdoor-air temperature sensor, a sunshine sensor and the like, in other words, voltages corresponding respectively to resistance values of these setter and sensors are inputted, independently of each other, successively to an A/D (analog/digital) converter through a multiplexor. The A/D converter converts the analog temperature data or voltages to digital data which are then inputted successively to the microcomputer. On the basis of these temperature data, the microcomputer executes calculation to send a control signal to an actuator for an air-mixing door, for example, which determines a mixing ratio between hot air and cold air, thereby controlling an opening angle of the air-mixing door.

The arrangement of the control system of the type referred to above is generally such that, on the basis of the temperature data from the indoor-air temperature setter and the plurality of temperature sensors, the microcomputer calculates a single basic temperature value which forms the basis of control. On the basis of the basis temperature value, the computer outputs the control signal to the actuator.

Since, in the above control system, the basic temperature value is calculated by the microcomputer, it is required for the microcomputer to have a high arithmetic capacity. The microcomputer high in arithmetic capacity is large in size and is expensive.

On the other hand, disclosed on pages 21-22 of the service manual entitled "MAZDA (DIESEL KIKI) PURE AUTO-AIR-CONDITIONER SERVICE MANUAL" (CAT. NO. 525179; April, 1984) is an air-conditioner control system which is provided with an operational amplifier. In place of a microcomputer, the operational amplifier calculates an analog basic temperature value on the basis of the indoor-air temperature setter and the various temperature sensors. The operational amplifier has an output terminal and an inverting input terminal which are connected to each other through a negative feedback resistor. The indoor-air temperature setter and the various temperature sensors are connected to the inverting input terminal of the operational amplifier through respective input resistors. A reference voltage from a reference-voltage generating circuit is inputted to a noninverting input terminal of the operational amplifier. On the basis of voltages corresponding respectively to the resistance values of the indoor-air temperature setter and the temperature sensors, the operational amplifier outputs voltage which represents the aforementioned basic temperature value. The output voltage from the operational amplifier is digitized by and A/D converter, and the digitized data are inputted to a microcomputer. With the arrangement disclosed in the above-mentioned service manual, a burden of the microcomputer is lightened correspondingly to the calculation executed by the operational amplifier, so that it is not required for the microcomputer to have very so high arithmetic capacity. Thus, it is possible for the arrangement to use the microcomputer which is small in size and is inexpensive.

In the control system disclosed in the above-mentioned service manual, the circuit for generating the reference voltage inputted to the operational amplifier is composed of a pair of resistors connected in series to each other. Voltage at the junction between the pair of resistors is offered as the reference voltage. Thus, the reference voltage is constant.

By the way, the various resistors employed in the above control system have their respective errors in resistance value. However, these errors cannot be taken up because the reference voltage is constant, so that air cannot be conditioned with high accuracy on the basis of the temperature data from the indoor-air temperature setter and the temperature sensors.

Generally, it is known well to adjust the reference voltage inputted to the operational amplifier, by the use of a variable resistor. It may be considered that an attempt is made to apply this adjusting technique to the above-described air-conditioner control system to take up the aforementioned errors. In such case, however, problems arise as to simplification of the adjusting operation carried out prior to shipment of the control system and simplification of instruments required for the adjusting operation. This is because it is expected that an adjusting operator connects a voltmeter to the output terminal of the operational amplifier and adjusts the reference voltage while watching the voltmeter. The need of the voltmeter, the need of the operation connecting the voltmeter to the operational amplifier, and so on result in an increase in the cost required for the adjustment. In particular, when a finished or completed control system, in which the entire components have been accommodated in a control box, is re-adjusted, the aforesaid adjusting operation is made more troublesome and cumbersome, because the control box is required to be opened.

SUMMARY OF THE INVENTION

It is an object of the invention to provide an air-conditioner control system in which output voltage from an operational amplifier is displayed on display means of an air conditioner with the aid of a microcomputer, thereby enabling simplification of adjusting operation and simplification of instruments required for the adjusting operation to be achieved.

According to the invention, there is provided a control system for controlling actuator means and display means of an air conditioner, the control system comprising:

(a) a plurality of temperature-data input terminals;

(b) reference-voltage generating means including a variable resistor, for generating an adjustable reference voltage;

(c) an operational amplifier having an inverting input terminal, a noninverting terminal and an output terminal, the output terminal and the inverting input terminal being connected to each other through a negative feedback resistor, wherein the temperature-data input terminals are connected to the inverting input terminal through respective input resistors, and wherein the reference voltage from the reference-voltage generating means is inputted to the noninverting input terminal;

(d) an A/D converter for converting an output voltage from the operational amplifier to digital data;

(e) mode-signal generating means for sending a mode signal to a below-mentioned microcomputer; and
(f) the microcomputer including:
(i) judging means for judging whether the air conditioner is in a normal control mode or an adjusting mode, on the basis of the mode signal from the mode-signal generating means,
(ii) normal-control-mode executing means for outputting a control signal representative of a current air-conditioning state, to the display means and for outputting a control signal to the actuator means of the air conditioner on the basis of the digital data from the A/D converter when the normal-control-mode executing means receives a judgment signal from the judging means indicative of the normal control mode, and
(iii) adjusting-mode executing means for outputting a control signal representative of the output voltage from the operational amplifier, to the display means, on the basis of the digital data from the A/D converter when the adjusting-mode executing means receives a judgment signal from the judging means indicative of the adjusting mode.

DETAILED DESCRIPTION

Figure 1:
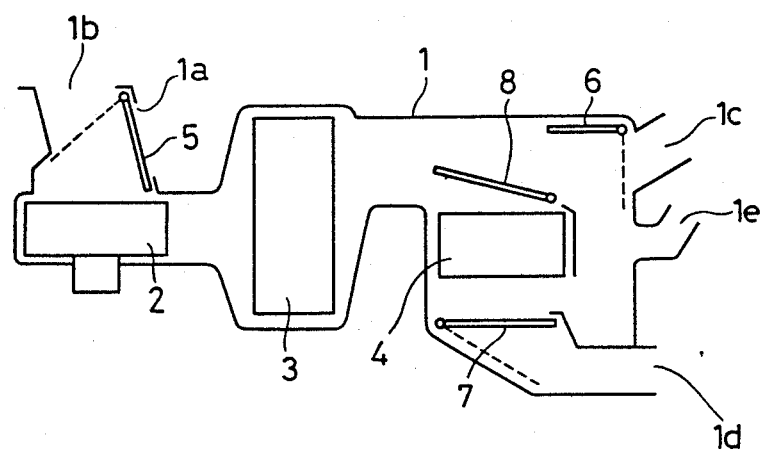
FIG. 1 is a diagrammatic view of an air conditioner for vehicles, to which an embodiment of a control system according to the invention is to be applied.

Referring first to FIGS. 1 through 6, there is shown an air-conditioner control system according to an embodiment of the invention. As shown in FIG. 1, an air conditioner, to which the control system is to be applied, comprises a blower 2, an evaporator 3 and a heater core 4 which are arranged within a duct 1 in the mentioned order from the upstream side with reference to the air flowing direction. The duct 1 is provided with an indoor-air introducing inlet 1a and an outdoor-air introducing inlet 1b. By adjusting pivotal movement of a door 5 associated with the inlets 1a and 1b, either one of indoor air and outdoor air is selected, or a mixing ratio between the indoor air and the outdoor air is adjusted. The duct 1 is further provided with three outlets 1c, 1d and 1e. A pair of doors 6 and 7 are associated respectively with the outlets 1c and 1d. Control of pivotal movements of the respective doors 6 and 7 enables air blowing directions or air blowing modes to be selected. An air-mixing door 8 is arranged adjacent the heater core at a location between the evaporator 3 and the heater core 4. Control of pivotal movement of the air-mixing door 8 enables a mixing ratio between cold air having passed through the evaporator 3 and hot air to be passed through the heater core 4 to be varied so that the temperature of air blown is adjusted. Further, control of rotational speed of the blower 2 enables a blown airflow quantity to be adjusted.

Figure 2:
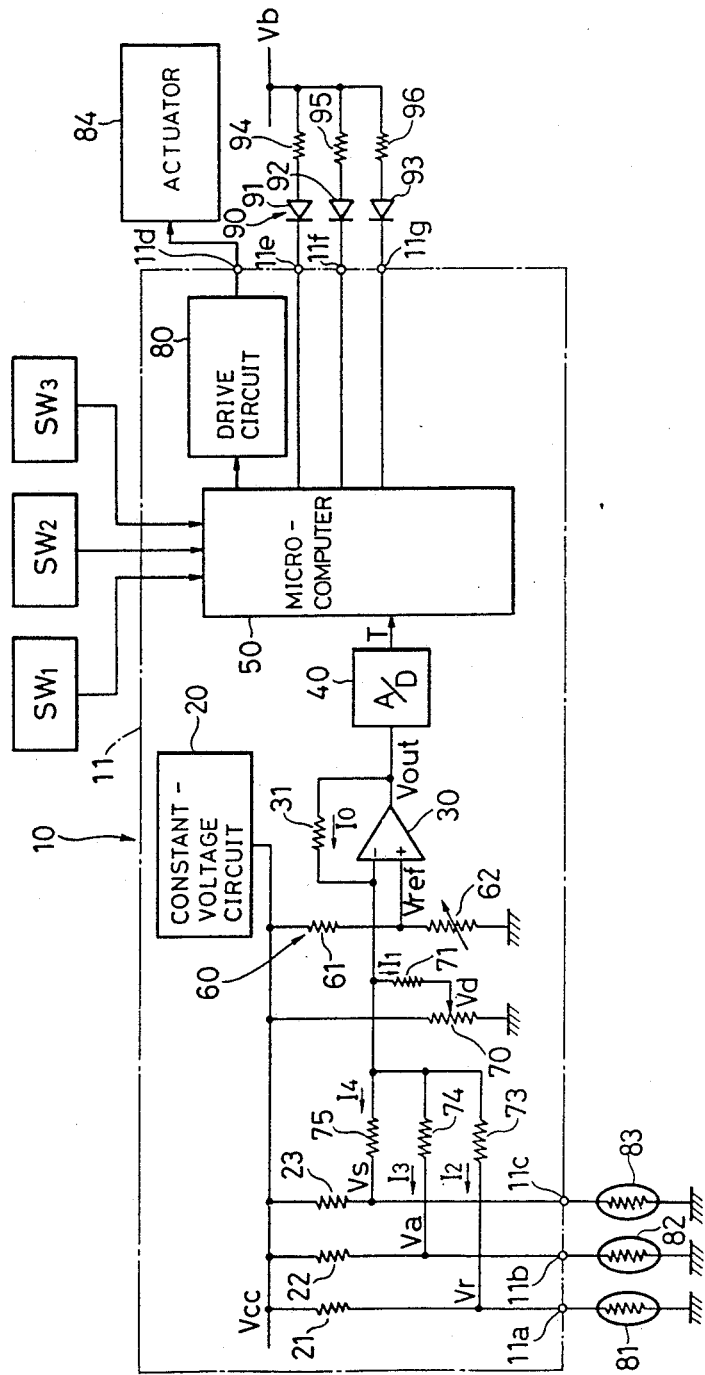
FIG. 2 is a circuit diagram showing the embodiment of the control system.

FIG. 2 shows a control system 10 for controlling the air conditioner illustrated in FIG. 1. The control system 10 comprises a control box 11 in which almost all of components of the control system 10 are accommodated as illustrated in FIG. 2.

Three push-button switches $SW_1$, $SW_2$ and $SW_3$ are associated with the control box 11, for designating the air blowing directions or the air blowing modes. The switch $SW_1$ is provided for opening the outlet 1c, the switch $SW_2$ is provided for opening the outlet 1d, and the switch $SW_3$ is provided for opening both the outlets 1c and 1d.

The control box 11 is further provided with three temperature-data input terminals 11a, 11b and 11c, and a plurality of output terminals 11d through 11g.

The temperature-data input terminals 11a, 11b and 11c are connected to a constant-voltage circuit 20 through respective pull-up resistors 21, 22 and 23.

The control system 10 further comprises an operational amplifier 30, an A/D (analog/digital) converter 40 for converting output voltage $V_{out}$ from the operational amplifier 30 to digital data, and a microcomputer 50 receiving the digital data from the A/D converter 40.

The operational amplifier 30 has an output terminal and an inverting input terminal which are connected to each other through a negative feedback resistor 31.

The operational amplifier 30 also has a noninverting input terminal to which reference voltage $V_{ref}$ is inputted from a reference-voltage generating circuit 60. The reference-voltage generating circuit 60 is composed of a resistor 61 and a variable resistor 62 which are connected in series to each other. Specifically, the resistor 61 has one end which is connected to the constant voltage circuit 20, while the variable resistor 62 has one end which is grounded. Voltage at the connection between the other ends of the respective resistors 61 and 62 is offered as the aforesaid reference voltage $V_{ref}$.

An indoor-air temperature setter 70 consisting of a variable resistor has a movable contact which is connected to the inverting input terminal of the operational amplifier 30 through an input resistor 71. One end of the indoor-air temperature setter 70 is connected to the constant voltage circuit 20, while the other end of the indoor-air temperature setter 70 is grounded. Voltage $V_d$ at the movable contact of the indoor-air temperature setter 70 represents a setting indoor-air temperature. A manipulating section of the indoor-air temperature setter 70 projects out of the control box 11 so as to enable the movable contact of the indoor-air temperature setter 70 to be adjusted from the outside. In this connection, when the manipulating section is so operated as to raise the setting indoor-air temperature, the voltage $V_d$ is raised.

The temperature-data input terminals 11a, 11b and 11c are connected to the inverting input terminal of the operational amplifier 30 through respective input resistors 73, 74 and 75.

Figure 4:
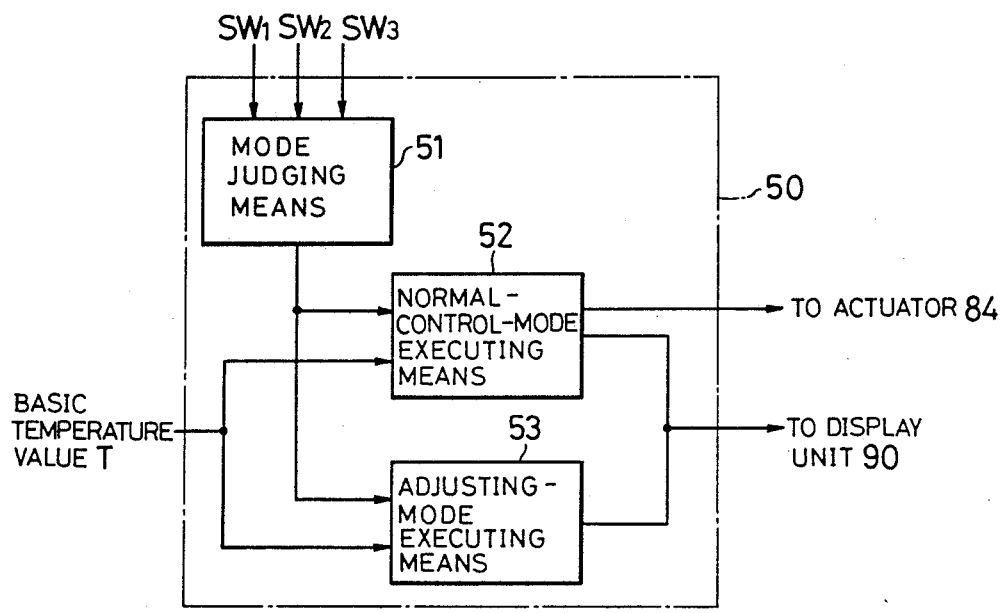
FIG. 4 is a block diagram showing the function of a microcomputer illustrated in FIG. 2.

The microcomputer 50 is provided substantially with mode judging means 51, normal-control-mode executing means 52 and adjusting-mode executing means 53 as shown in FIG. 4. The mode judging means 51 judges that the air conditioner is in an adjusting mode only if the mode judging means 51 receives ON-signals from all of the respective switches $SW_1$, $SW_2$ and $SW_3$ when a power switch (not shown) is turned on. On the other hand, when the mode judging means 51 receives one or two of the ON-signals from the respective switches $SW_1$, $SW_2$ and $SW_3$, the mode judging means 51 judges that the air conditioner is in a normal control mode. The normal-control-mode executing means 52 is operative in response to a mode signal from the mode judging means 51, which indicates the normal control mode, to execute the normal control mode to be described later. On the other hand, the adjusting-mode executing means 53 is operative in response to a mode signal indicating the adjusting mode from the mode judging means 51 to execute the adjusting mode to be described later.

The microcomputer 50 has a plurality of output ports which are connected respectively to a plurality of drive circuits 80 (only one shown in the figure for simplification). These drive circuits 80 are connected respectively to a plurality of output terminals 11d (only one shown in the figure for simplification) of the control box 11. Other three output ports of the microcomputer 50 are connected respectively to the remaining three output terminals 11e, 11f and 11g of the control box 11.

Mounted to the control box 11 of the control system 10 is a display unit 90 for displaying the air blowing directions or the air blowing modes. The display unit 90 is provided with three light-emitting diodes 91, 92 and 93 whose respective cathodes are connected respectively to the output terminals 11e, 11f and 11g. Battery voltage $V_b$ or voltage $V_{cc}$ of the constant voltage circuit 20 is applied to anodes of the respective light-emitting diodes 91, 92 and 93 through respective resistors 94, 95 and 96. The arrangement is such that when an output level at either one of the three output ports of the microcomputer 50 is brought to a low-level, current is caused to pass through one of the light-emitting diodes 91, 92 and 93 corresponding to the low-level output, thereby emitting light.

In a state in which the control system 10 constructed as above is installed on a vehicle, an indoor-air temperature sensor 81, an outdoor-air temperature sensor 83 and a sunshine sensor 84 are arranged on the outside of the control box 11. Each of the sensors 81, 82 and 83 is composed of a negative-temperature-coefficient thermistor. The sensors 81, 82 and 83 have their respective one ends which are connected respectively to the temperature-data input terminals 11a, 11b and 11c. The other ends of the respective sensors 81, 82 and 83 are grounded.

In the state in which the control system 10 is installed on the vehicle, an actuator 84 for the air-mixing door 8 is connected to the output terminal 11d. Actuators (not shown) for the remaining doors 5, 6 and 7 as well as for the blower 2 are connected respectively to other output terminals (not shown) of the control box 11 in a manner similar to that described above.

Normal control carried out by the control system 10 in the state in which the control system 10 is installed on the vehicle will be described in detail. That is, when the resistance values of the respective sensors 81, 82 and 83 vary depending upon respective variations in the indoor-air temperature, the outdoor-air temperature and the sunshine intensity, voltages $V_r$, $V_a$ and $V_s$ at the respective temperature-data input terminals 11a, 11b and 11c vary. The voltage $V_r$ indicates the indoor-air temperature, the voltage $V_a$ indicates the outdoor-air temperature, and the voltage $V_s$ indicates a tempera- ture-converted value of the sunshine intensity. The higher each temperature, the lower a corresponding one of these voltages $V_r$, $V_a$ and $V_s$.

When it is supposed that the current passing through the negative feedback resistor 31 connected to the operational amplifier 30 is $I_0$, and currents passing through the respective input resistors 71, 73, 74 and 75 are respectively $I_1$, $I_2$, $I_3$ and $I_4$, the following relationships exist:

$$I_0 = I_1 + I_2 + I_3 + I_4 \quad (1)$$

$$I_0 = (V_{out} - V_{ref})/R_{31} \quad (2)$$

$$I_1 = (V_{ref} - V_d)/R_{71} \quad (3)$$

$$I_2 = (V_{ref} - V_r)/R_{73} \quad (4)$$

$$I_3 = (V_{ref} - V_a)/R_{74} \quad (5)$$

$$I_4 = (V_{ref} - V_s)/R_{75} \quad (6)$$

In the above equations, $R_{31}$, $R_{71}$, $R_{73}$, $R_{74}$ and $R_{75}$ represent resistance values of the respective resistors 31, 71, 73, 74 and 75. In this connection, these resistance values are far larger than the resistance values of the respective pull-up resistors 21, 22 and 23, the resistance values of the respective temperature sensors 81, 82 and 83, and resistance values of respective standard resistors 81', 82' and 83' to be described later with reference to FIG. 3.

The output voltage $V_{out}$ from the operational amplifier 30 can be obtained from the following equation by substitution of the equations (2) through (6) for the equation (1):

$$V_{out} = [1 + R_{31}(1/R_{73} + 1/R_{74} + 1/R_{74} + 1/R_{75})] \times V_{ref} - R_{31}(V_d/R_{71} + V_r/R_{73} + V_a R_{74} + V_s/R_{75}) \quad (7)$$

As will be clear from the equation (7), the output voltage $V_{out}$ from the operational amplifier 30 includes an adding term of the voltages $V_d$, $V_r$, $V_a$ and $V_s$ to which weights different from each other are applied by the respective input resistors $R_{71}$, $R_{73}$, $R_{74}$ and $R_{75}$. Accordingly, the output voltage $V_{out}$ represents a basic temperature value which is based on the indoor-air temperature, the outdoor-air temperature, the sunshine intensity and the setting temperature.

The output voltage $V_{out}$ from the operational amplifier 30 is digitized by the A/D converter 40. The A/D converter 40 consists of, for example, eight bits so that the A/D converter 40 converts the output voltage $V_{out}$ to the basic temperature value T which consists of either one of numerical values from [0] to [255].

In the state in which the control system 10 is installed on the vehicle, there is no case where the switches $SW_1$, $SW_2$ and $SW_3$ for designating the air blowing direction are turned on simultaneously when the power switch is turned on. Accordingly, in the state in which the control system 10 is installed on the vehicle, the microcomputer 50 executes the normal control mode when the power switch is turned on. That is, on the basis of the basic temperature value T inputted from the A/D converter 40, other switch signals and so on, the microcomputer 50 executes various controls for conditioning air. In other words, the microcomputer 50 outputs control signals respectively to the drive circuit of the blower 2, the drive circuit 80 of the actuator 84 for the air-mixing door 8, and drive circuits of the actuators for the remaining respective doors 5, 6 and 7. Further, the microcomputer 50 outputs a control signal indicative of the air blowing direction to the display unit 90, thereby causing any one of the light-emitting diodes 91, 92 and 93 to emit light.

In the manner described above, it can be dispensed with for the microcomputer 50 to calculate the basic temperature value T which forms basic information for control. Thus, it is possible to use the microcomputer 50 which is small in size and which is inexpensive.

Figure 3:
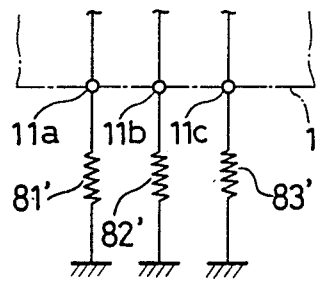
FIG. 3 is a fragmentary circuit diagram showing standard resistors to be connected in place of temperature sensors illustrated in FIG. 2.

Adjusting operation is carried out prior to shipment of the control system 10. The adjusting operation will be described in detail below. As shown in FIG. 3, the aforementioned standard resistors 81', 82' and 83' or dummy resistors are connected respectively to the temperature-data input terminal 11a, 11b and 11c. The indoor-air temperature setter 70 is set to a standard temperature such as, for example, 25° C. Further, the power switch is turned on in the state in which the switches $SW_1$, $SW_2$ and $SW_3$ for designating the air blowing directions are all turned on. Under these conditions, the microcomputer 50 executes the adjusting mode. That is, the light-emitting diodes 91, 92 and 93 are controlled by the microcomputer 50 in such a manner that when the output voltage $V_{out}$ is lower than a predetermined standard voltage, the first light-emitting diode 91 is caused to emit light; when the output voltage $V_{out}$ is higher than the standard voltage, the third light-emitting diode 93 is caused to emit light; and when the output voltage $V_{out}$ is equal to the standard voltage, the second light-emitting diode 92 is caused to emit light. An adjusting operator inserts a jig into an adjusting bore formed in the control box 11, and adjusts the resistance value of the variable resistor 62 of the reference-voltage generating circuit 60 by the use of the jig while watching the turned-on state of the light-emitting diodes 91, 92 and 93, thereby bringing the output voltage $V_{out}$ to the standard voltage.

Since, during the above-described adjusting operation, the output voltage from the operational amplifier 30 can be displayed on the display unit 90 by the control of the microcomputer 50, it is not required to use a voltmeter. Further, operation connecting the voltmeter to the output terminal of the operational amplifier can also be omitted. Accordingly, the adjusting operation can be simplified. This makes it possible to reduce the cost required for the adjustment.

Moreover, when the finished control system 10, in which almost all of the components have been accommodated in the control box 11, is re-adjusted, the abovementioned adjustment can be effected without opening the control box 11, making it possible to simplify the operation extremely.

Figure 5:
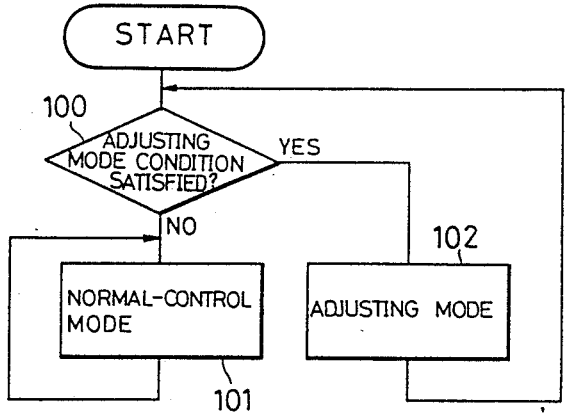
FIG. 5 is a main flow chart executed by the microcomputer illustrated in FIG. 2.
Figure 6:
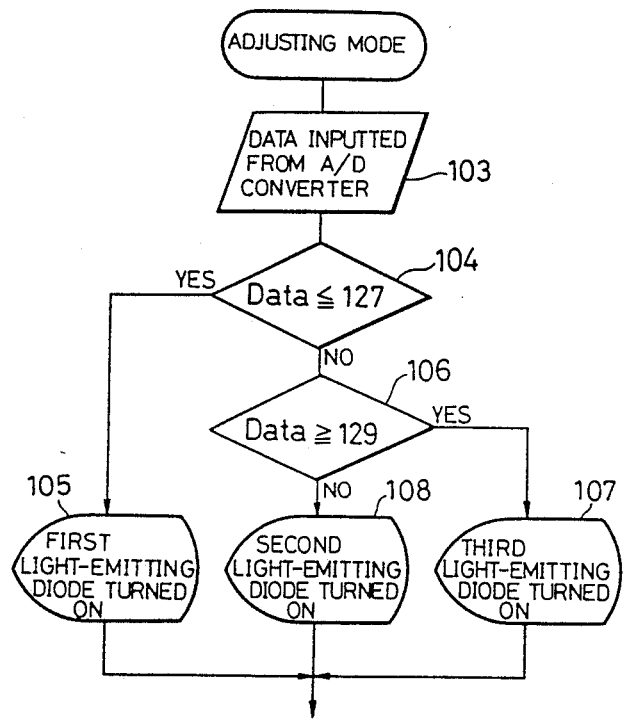
FIG. 6 is a flow chart of an adjusting mode illustrated in FIG. 5.

FIGS. 5 and 6 show a program executed by the microcomputer 50. As shown in FIG. 5, it is first judged at a step 100 on the basis of the signals from the respective switches $SW_1$, $SW_2$ and $SW_3$ whether or not the adjusting mode condition is satisfied. If the judgment indicates that the adjusting mode condition is not satisfied, the normal control is executed at a step 101. On the other hand, if the judgment at the step 100 indicates that the adjusting mode condition is satisfied, the adjusting mode is executed at a step 102.

The adjusting mode is executed as shown in FIG. 6. That is, the data representative of the digitized basic temperature value from the A/D converter 40 are inputted at a step 103. In this connection, as described previously, the data consist of one of the numerical values from [0] to [255], and the numerical value [128] indicates the standard voltage of the output voltage $V_{out}$.

Subsequently, it is judged at a step 104 whether or not the above data are equal to or less than [127]. If the judgment is affirmative, the first light-emitting diode 91 is turned on at a step 105 to display that the output voltage $V_{out}$ is lower than the standard voltage. If it is judged at the step 104 that the data exceeds [127], it is judged at a subsequent step 106 whether or not the data are equal to or higher than [129]. If the judgment is affirmative, the third light-emitting diode 93 is turned on at a step 107 to display that the output voltage $V_{out}$ is higher than the standard voltage.

If it is judged at the step 106 that the data are less than [129], in other words, if it is judged that the data is [128], the second light-emitting diode 92 is turned on at a step 108 to display that the output voltage $V_{out}$ is the standard voltage.

Figure 7:
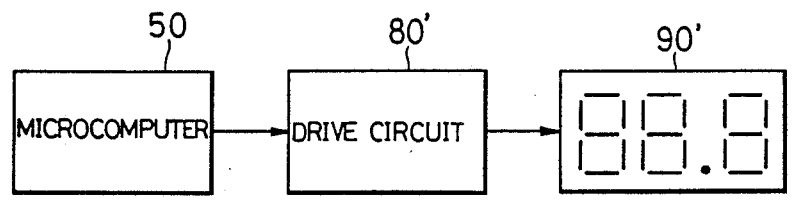
FIG. 7 is a view showing a modified display unit controlled by the microcomputer.

The control system 10 may additionally be provided with a display unit 90' shown in FIG. 7. A drive circuit 80' for the display unit 90' is connected to the output port of the microcomputer 50. The display unit 90' is so designed as to respond to a control signal from the microcomputer 50 when the same executes the normal control mode, to display the setting indoor-air temperature by a number of three figures, for example. In this case, the voltage at the movable contact of the indoor-air temperature setter 70 shown in FIG. 2, that is, the data on the setting indoor-air temperature are inputted to the microcomputer 50 through the A/D converter 40 or another A/D converter. On the basis of the data, the microcomputer 50 outputs the control signal to the display unit 90'.

Figure 8:
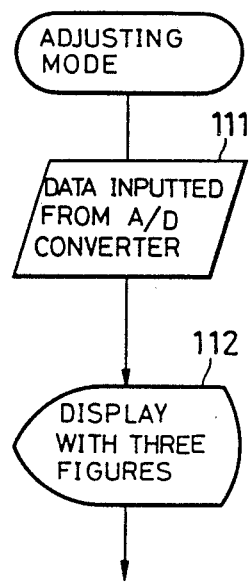
FIG. 8 is a flow chart showing a modified adjusting mode associated with the display unit illustrated in FIG. 7.

In the adjusting mode, the microcomputer 50 can cause the display unit 90' to display the output voltage $V_{out}$ from the operational amplifier 30. Specifically, as shown in FIG. 8, the data from the A/D converter 40 are inputted at a step 111. Subsequently, a control signal is outputted at a step 112 so as to cause the display unit 90' to display the data as they are by a number of three figures. In this case, an adjusting operator adjusts the reference voltage in such a manner as to bring the numerical value displayed on the display unit 90' to [128].

It is to be understood that the invention is not limited to the above-described embodiment, but various modifications can be made to the invention. For instance, the indoor-air temperature setting means may be composed of a pair of push-button switches [UP] and [DOWN]. In this case, signals from the respective switches are inputted to the microcomputer, not through the A/D converter. The operational amplifier executes calculation on the basis of temperature data from a plurality of temperature-data input terminals. The microcomputer calculates a basic temperature value on the basis of the calculation results and a setting temperature designated by manipulation of the switches.

What is claimed is:

1. A control system for controlling actuator means and display means of an air conditioner, said control system comprising:
    (a) a plurality of temperature-data input terminals;
    (b) reference-voltage generating means including a variable resistor, for generating an adjustable reference voltage;
    (c) an operational amplifier having an inverting input terminal, a noninverting terminal and an output terminal, said output terminal and said inverting input terminal being connected to each other through a negative feedback resistor, wherein said temperature-data input terminals are connected to said inverting input terminal through respective input resistors, and wherein said reference voltage from said reference-voltage generating means is inputted to said noninverting input terminal;

(d) an A/D converter for converting an output voltage from said operational amplifier to digital data;

(e) mode-signal generating means for sending a mode signal to a below-mentioned microcomputer; and (f) the microcomputer including:

(i) judging means for judging whether the air conditioner is in a normal control mode or an adjusting mode, on the basis of said mode signal from said mode-signal generating means, (ii) normal-control-mode executing means for outputting a control signal representative of a current air-conditioning state, to said display means and for outputting a control signal to said actuator means of said air conditioner on the basis of said digital data from said A/D converter when said normal-control-mode executing means receives a judgment signal from said judging means indicative of said normal control mode, and (iii) adjusting-mode executing means for outputting a control signal representative of the output voltage from said operational amplifier, to said display means, on the basis of said digital data from said A/D converter when said adjusting-mode executing means receives a judgment signal from said judging means indicative of said adjusting mode.

2. A control system according to claim 1, further comprising indoor-air temperature setting means having a variable resistor, said indoor-air temperature setting means being connected to said inverting input terminal of said operational amplifier through another input resistor.

3. A control system according to claim 1, wherein said display means is provided with first, second and third light-emitting diodes, and wherein in said adjusting mode, said first light-emitting diode emits light when said output voltage from said operational amplifier is lower than a predetermined level, said second light-emitting diode emits light when said output voltage from said operational amplifier is equal to said predetermined level, and said third light-emitting diode emits light when said output voltage from said operational amplifier is higher than said predetermined level.

4. A control system according to claim 3, wherein said first to third light-emitting diodes represent respectively air blowing modes different from each other, of said air conditioner during said normal control mode.

5. A control system according to claim 2, wherein said display means is composed of a numeral display unit, and wherein in said adjusting mode, said numeral display unit displays a numerical value corresponding to the output voltage from said operational amplifier.

6. A control system according to claim 5, wherein said numeral display unit displays indoor-air temperature set by said indoor-air temperature setting means in said normal control mode.

7. A control system according to claim 1, wherein said mode-signal generating means is provided with a plurality of switches, and wherein when these switches are turned on simultaneously, said mode-signal generating means outputs a mode signal indicative of said adjusting mode.

8. A control system according to claim 7, wherein said switches designate an air blowing direction in said normal control mode.

9. A method of adjusting a control system for controlling actuator means and display means of an air conditioner, said control system comprising:

(a) a plurality of temperature-data input terminals;

(b) reference-voltage generating means including a variable resistor, for generating an adjustable reference voltage;

(c) an operational amplifier having an inverting input terminal, a noninverting terminal and an output terminal, said output terminal and said inverting input terminal being connected to each other through a negative feedback resistor, wherein said temperature-data input terminals are connected to said inverting input terminal through respective input resistors, wherein said reference voltage from said reference-voltage generating means is inputted to said noninverting input terminal;

(d) an A/D converter for converting an output voltage from said operational amplifier to digital data;

(e) mode-signal generating means for sending a mode signal to a below-mentioned microcomputer; and (f) the microcomputer including:

(i) judging means for judging whether the air conditioner is in a normal control mode or an adjusting mode, on the basis of said mode signal from said mode-signal generating means, (ii) normal-control-mode executing means for outputting a control signal representative of a current air-conditioning state, to said display means and for outputting a control signal to said actuator means of said air conditioner on the basis of said digital data from said A/D converter when said normal-control-mode executing means receives a judgment signal from said judging means indicative of said normal control mode, and (iii) adjusting-mode executing means for outputting a control signal representative of the output voltage from said operational amplifier, to said display means, on the basis of said digital data from said A/D converter when said adjusting-mode executing means receives a judgment signal from said judging means indicative of said adjusting mode, said method comprising the steps of:

(v) connecting a plurality of standard resistors respectively to said temperature-data input terminals;

(w) outputting the mode signal from said mode-signal generating means, representative of said adjusting mode, to said microcomputer;

(x) causing said display means to display said output voltage from said operational amplifier on the basis of said control signal from said microcomputer; and (y) adjusting said variable resistor of said reference-voltage generating means so as to bring the output voltage from said operational amplifier displayed on said display means, to a predetermined voltage.

* * * * *